(12) United States Patent
Volkmer (10) Patent No.: US 9,904,452 B2
(45) Date of Patent: Feb. 27, 2018

(54) BUILDING USER SPECIFIC USER INTERFACE INSTANCES

(71) Applicant: SAP SE, Walldorf (DE)

(72) Inventor: Michael Volkmer, Heidelberg (DE)

(73) Assignee: SAP SE, Walldorf (DE)

( * ) Notice: Subject to any disclaimer, the term of this patent is extended or adjusted under 35 U.S.C. 154(b) by 394 days.

(21) Appl. No.: 14/834,444

(22) Filed: Aug. 25, 2015

(65) Prior Publication Data

US 2017/0064004 A1    Mar. 2, 2017

(51) Int. Cl.
*G06F 3/048*    (2013.01)
*G06F 3/0484*   (2013.01)

(52) U.S. Cl.
CPC ................ *G06F 3/04847* (2013.01)

(58) Field of Classification Search
CPC .................................... G06F 3/04847
USPC ......................................... 715/747
See application file for complete search history.

(56) References Cited

U.S. PATENT DOCUMENTS

| | | | | |
|---|---|---|---|---|
| 7,496,849 B2* | 2/2009 | Abbott | ................. | G06F 1/163 |
| | | | | 706/14 |
| 9,383,965 B1* | 7/2016 | Qureshi | ............. | G06F 3/04847 |
| 9,535,663 B2* | 1/2017 | Yaseen | | |
| 9,626,097 B2* | 4/2017 | Jeon | ................ | G06F 3/0488 |
| 9,665,865 B1* | 5/2017 | Xing | ............... | G06Q 20/206 |
| 2009/0094576 A1* | 4/2009 | Bouchard, Sr. | ........... | G06F 8/30 |
| | | | | 717/104 |
| 2013/0198663 A1* | 8/2013 | Matas | ................ | G06T 11/60 |
| | | | | 715/765 |
| 2014/0089225 A1* | 3/2014 | Volkmer | ............ | G06Q 10/067 |
| | | | | 705/348 |
| 2014/0379413 A1* | 12/2014 | Volkmer | ......... | G06Q 10/06316 |
| | | | | 705/7.26 |
| 2015/0040064 A1* | 2/2015 | Adi | ................... | G06F 3/04847 |
| | | | | 715/810 |
| 2017/0064004 A1* | 3/2017 | Volkmer | ............ | G06F 3/04847 |

* cited by examiner

*Primary Examiner* — David Phantana Angkool (57) ABSTRACT

A user specific meta application instance is launched. The user specific meta application instance inherits a pattern of display and at least one context of a meta application instance. A value for the at least one context of the user specific meta application instance is received. A selection of one or more applications from a plurality of applications provided by the user specific meta application instance is received. Each application from the one or more applications is associated with a pattern of display. One or more application contexts that match the at least one context of the user specific meta application instance are determined for each application from the selected one or more applications. The matching one or more application contexts are applied to each application from the selected one or more applications. A user specific UI based on the user specific meta application instance is displayed.

20 Claims, 7 Drawing Sheets

BUILDING USER SPECIFIC USER INTERFACE INSTANCES

FIELD

Embodiments described herein generally relate to human perceptible elements of electronic information (e.g., text or graphics) and user interaction with a computer system to control the presentation of display data wherein an interactive user environment is specifically established or modified to suit the needs of the user and wherein distinct interface elements, such as icons, tiles, buttons, or menus, may be manipulated.

BACKGROUND

User interfaces (UIs) provide mechanism to interact with a computer system by inputting and outputting information to and from the computer system. Graphical user interfaces (GUIs) are a type of UIs that enable input or output by icons, menus and other graphical elements. Typically, graphical elements represent applications, files, folders, network locations, etc. Applications represented by graphical elements in a GUI include monitoring, support and service applications as well as portals and UIs (dashboards, launchpads, etc.) that provide centralized access to a number of other applications. There are applications that provide personalized UI clients that enable users to access the other applications. For example, SAP Fiori® Launchpad is a shell that hosts SAP Fiori applications, and provides applications with services such as navigation, personalization, embedded support, and application configuration. Such applications provide an entry point to other applications, for example, applications installed on mobile and desktop devices. Further, these applications can display a home page with tiles, which can display live status indicators, such as the number of open tasks. Each tile can represent an application that a user can launch. However, those personalized UI clients follow a predetermined pattern of display according to which each business application that is hosted is represented by a tile in the personalized UI client.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for building user specific UI instances are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
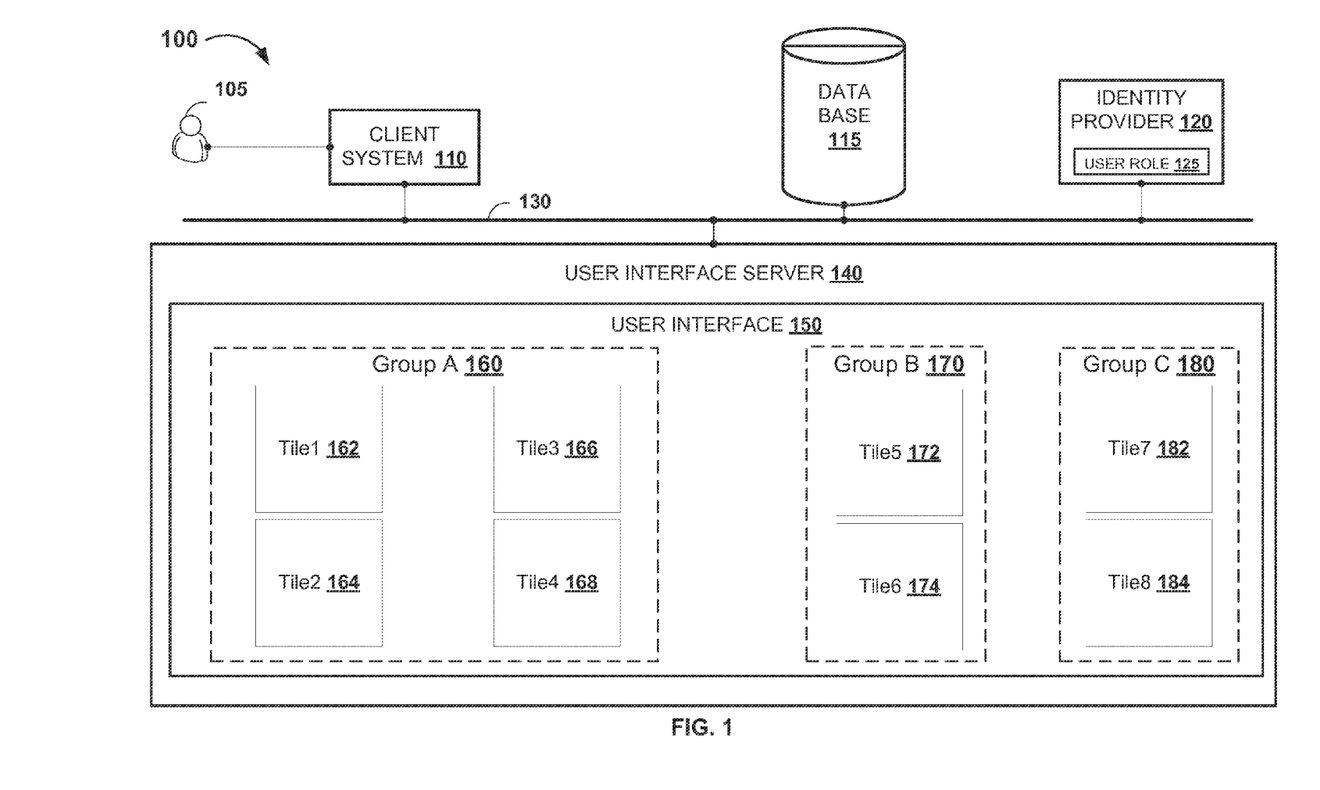
FIG. 1 is a block diagram illustrating a system architecture to select a tile representing a meta application from a user interface (UI) of tiles, according to one embodiment

FIG. 1 illustrates system architecture 100 to select a tile from a UI 150 of tiles, where the tile represents a meta application, according to one embodiment. User 105 may access UI 150 through a client system 110. Client system 110 may be a computer program utilized by user 105 to access resources available on a network such as network 130. Network 130 may be a public network such as the internet or a private network such as intranet of an organization. Typically, client systems such as client system 110 may be viewed as a hardware system on which a software client is running. Client systems access services made available by servers. Client systems such as client system 110 include, but are not limited to, computers, servers, mobile devices or any other electronic device having software installed thereon, that allows the device to access, consume and display web content. UI 150 may be a service provided by user interface server 140, according to one embodiment.

Services such as UI 150 may be protected with one or more authentication and authorization standards. For example, a service may be protected with Security Assertion Markup Language (SAML) authentication and authorization standard. That is, user 105 must be authenticated first and then granted access to UI 150. User 105 may be authenticated via a number of authentication methods. For example, user 105 may be prompted by user interface server 140 for credentials input to be authenticated. In an alternative, a Single Sign-On functionality is enabled and user 105 authenticates with an identity provider such as identity provider 120. Identity provider 120 may be viewed as a service that issues authentication assertions for a number of providers of protected services. In one embodiment, identity provider 120 may provide authentication assertion for user 105 to user interface server 140.

Upon authentication of user 105, user role 125 of user 105 is retrieved from identity provider 120. User 105 is granted access to UI 150. In one embodiment, UI 150 is a personalized UI client that enables users to access other applications. UI 150 is a shell that hosts applications, and provides the applications with services including, but not limited to, navigation, personalization, embedded support, and application configuration. Applications in UI 150 are represented by types of graphical elements determined by patterns. A pattern is a common reusable design or layout template for displaying graphical elements. An application is associated with a specific pattern and thus, when hosted by UI 150, the application is displayed according to that specific pattern. Further, UI 150 itself follows a predetermined pattern of display according to which each hosted business application by UI may be represented. According to one embodiment, UI 150 may display hosted applications under a pattern "tile". The pattern "tile" represents the application with the graphical element of type "tile".

Tiles are GUI graphical elements that have other functionalities in addition to providing a shortcut access to applications. A tile may be a rectangular or square graphical element associated with an application. In other embodiments, tiles may be circular or ellipsoid structures. It would be appreciated that a tile may have various types of structure. Tiles can display real time information for corresponding applications. For example, live status indicators such as number of open tasks or summarized weather forecast. Displayed information can be presented in different forms on the tile, such as a simple text, a combination of text and image, or one or more images. When a tile is selected the application corresponding to the selected tile is launched.

UI 150 may include a number of tiles such as Tile '1' 162-Tile '8' 184. A tile from Tiles 162-184 may represent an application that a user can launch. Tiles included in the UI 150 may be filtered based on user role 125 of user 105. UI 150 may include tiles that represent corresponding applications that user 105 is allowed to access depending on rights associated with user role 125. One skilled in the art will recognize, however, that various embodiments may provide representations of the corresponding applications that are different from tiles. For example, icons, shapes, images (e.g., photographs, illustrations, art), and other graphical elements may be utilized to represent corresponding applications in UI 150, according to various embodiments.

UI 150 may be a GUI of tiles such as a Workspace or a Launchpad that represent a personalized UI client for launching and organizing access to applications. In UI 150 of tiles, a user is able to group, move and remove tiles. In addition, groups can be added, deleted, renamed, and reordered. As an output of such user input, a personalized Workspace or Launchpad may be created, according to one embodiment.

In UI 150, tiles are initially organized in groups based on category. For example, Tile '1' 162, Tile '2' 164, Tile '3' 166, and Tile '4' 168 may be included in Group 'A' 160. Respectively, Tile '5' 172 and Tile '6' 174 may be included in Group 'B' 170 and Tile '7' 182 and Tile '8' 184 may be included in Group 'C' 180. Groups may bring together tiles that represent applications with similar functions and are associated with the same category, according to one embodiment. Groups may bring together tiles that represent applications associated with different categories as well. For example, maintenance applications may form Group 'A' and monitoring applications may form Group 'B', etc. Groups may be added, deleted, changed, named, and renamed.

A tile may provide real time information for corresponding applications. For example, a tile may have live status indicators such a Key Performance Indicator (KPI). A tile KPI may display on the tile real time information for a number of open issues, according to one embodiment. Information displayed on the tile may depend on a number of factors, including, but not limited to, a user, a current project, a specific solution, etc. In one embodiment, a tile may not have a defined KPI and, therefore, information may not be displayed on the tile.

In one embodiment, a tile from UI 150 of tiles may represent a meta application rather than an application. A meta application may be a composite application that hosts other applications. The meta application is an entry point to the hosted applications, for example, installed on mobile and desktop devices. A meta application provides functionality for manipulating the layout, organization, navigation, personalization, etc., for the hosted applications. In one embodiment, a meta application may be designed to read and analyze other applications. For example, a meta application may analyze a given application to determine a pattern and one or more contexts associated with the application. Upon analyzing the application, a pattern "tile" and contexts "user" and "project" may be determined. A meta application may be a higher level of abstraction as compared to the applications that it hosts. A meta application may be defined by a set of attributes including a label, a pattern and one or more contexts. In one embodiment, the pattern and the one or more contexts of the meta application may override original patterns and contexts assigned to the hosted applications. In one embodiment, upon determination of application pattern and contexts, the meta application may display hosted applications under different patterns and contexts.

A label is a text field of the meta application. When a new instance of the meta application is created, a value for the label may be specified to personalize the new instance. For example, Tile '3' 166 and Tile '5' 172 may be separate instances of the same meta application. Tile '3' 166 and Tile '5' 172 may be created from a meta application by providing description "Tile 3" for label of Tile '3' 166 and description "Tile 5" for label of Tile '5' 172, according to one embodiment.

A pattern of a meta application may determine presentation layout of applications hosted by the meta application. For example, under a "tile" pattern, applications are displayed as tiles. A meta application may be associated with one pattern. The pattern of the meta application may be inherited by instances of the meta application, according to one embodiment.

Meta application instances inherit the contexts and patterns associated with the corresponding meta application from which the meta application instances are instantiated. A context of a meta application may determine various aspects of the hosted applications. A context may provide configuration information to an application. A context may include conditions and circumstances that affect the meta application and the applications hosted by the meta application, respectively. Examples for context may include a user, a project, a solution, etc. Information displayed by hosted applications are filtered based on a corresponding context, according to one embodiment. For example, real time information displayed on a tile may be filtered based on a user, a project or a solution.

Upon selection of a tile from the tiles, displayed on the UI 150, a corresponding application associated with the selected tile is launched. Tiles displayed on UI 150 that represent applications may not visually differ from tiles displayed on UI 150 that represent meta applications. For example, a meta application is launched when Tile '3' 166 from the UI 150 of tiles is selected. Upon launching an instance of a meta application user 105 may personalize the instance in a number of ways. For example, user 105 may create a user specific instance of the meta application. Once created and personalized, the user specific instance may be stored in memory, accessed when needed and further modified and personalized, according to one embodiment. The meta-application therefore allows a user to create a personalized user interface that provides a better visual effect and more productive environment.

Figure 2:
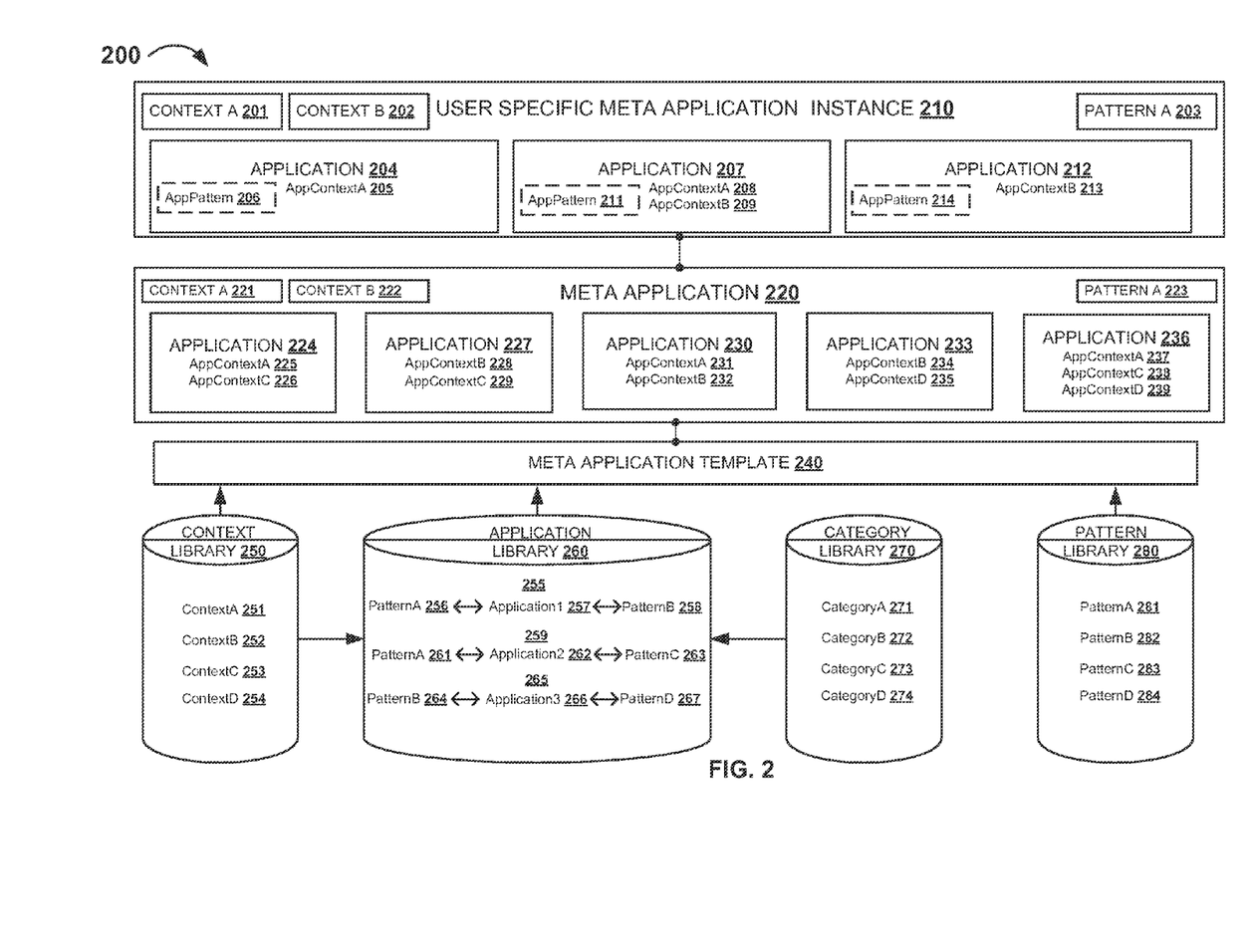
FIG. 2 is a block diagram illustrating a system architecture to render a user specific UI, according to one embodiment.

FIG. 2 illustrates a system architecture 200 to render a user specific meta application instance 210, according to one embodiment. A user specific UI may be a UI personalized for a user. A user specific UI may be displayed based on a user specific meta application instance such as user specific meta application instance 210. User specific meta application instance 210 may be viewed as an instance of meta application 220 that is personalized to fit requirements and preferences of user 105 (FIG. 1). For example, a UI that is personalized by a user to include certain applications, each having a predefined pattern and at least one context, under a common pattern and with contexts overridden in a way to be common with contexts of the UI, may be described as a user specific meta application instance. In one embodiment, meta application 220 may be launched upon selection of a corresponding Tile '3' 166 from a UI 150 of tiles.

Meta application 220 may be created from a template such as meta application template 240. Meta application template 240 may be a starting point for configuring new meta applications. Meta application template 240 may provide access to a number of libraries to enable selection of attributes and applications for meta applications. In one embodiment, meta application template 240 may be coupled to context library 250, application library 260 and pattern library 280 to provide multiple configuration options. A meta application template may be tailored for configuring meta applications to provide a particular service, for example a monitoring service. Context library 250, application library 260 and pattern library 280 may include certain contexts, applications and patterns that are meaningful for one service and have no meaning for another service. For example, contexts, applications and patterns for an update service may have no meaning for a monitoring service. Accordingly, one or more contexts from context library 250 may not be relevant. Similarly, on or more applications from application library 260 and one or more patterns from pattern library 280 may not be relevant for the monitoring service, according to various embodiments. Therefore, more than one meta application template may be available for creating and configuring meta applications. Each meta application template may provide a subset of configurable options depending on a relevant service.

Context library 250 provides a number of contexts for creation of meta applications based on meta application template 240. Context library 250 may provide contexts for applications from the application library 260 as well. A context from the context library 250 may be independently assigned to both a meta application and an application from application library 260. For example, Context 'A' 251 may be assigned to meta application 220 in one aspect, and to Application '1' 257 in another aspect. More than one contexts may be assigned to a meta application or an application. Both customers and providers may add new contexts in context library 250. Context library 250 may provide mechanisms for retrieving values of contexts from a database (e.g. database 115 of FIG. 1). For example, context library 250 may include an application programming interface (API) per each context to retrieve value for the context. For example, meta application 220 may be configured to include Context 'A' 251 and Context 'B' 252 from context library 250 as well as Pattern 'A' 281 from pattern library 280.

Pattern library 280 provides patterns for creation of meta applications through meta application template 240. In one embodiment, one pattern may be assigned to a meta application. For example, pattern library may include Pattern 'A' 281, Pattern 'B' 282, Pattern 'C' 283, and Pattern 'D' 284.

Applications that can be included in a meta application are provided by application library 260. Application library 260 includes a number of applications such as Application '1' 257, Application '2' 262 and Application '3' 266. In one embodiment, applications '1' 257-'3' 266 may be business applications and systems such as Enterprise Resource Planning (ERP) systems, Customer Relationship Management (CRM) systems. Application Lifecycle Management (ALM) systems, and so on.

Application library 260 may provide a mechanism for communication between an application from the application library and contexts assigned to the application. In one embodiment, application library 260 may provide an application programming interface (API). The API may enable communication between an application and corresponding contexts from context library 250 that are assigned to the application.

Applications may be associated with patterns in application library 260. For example, Application '1' 257 may be associated with Pattern 'A' 256 and Pattern 'B' 258 in association 255. Association of patterns with applications, such as association 255, determines the patterns according to which the corresponding applications can be displayed. In one embodiment, each pattern that is associated with an application from application library 260 represents a reference to a pattern from pattern library 280. For example, association 259 determines that Application '2' 262 may be displayed in a meta application under any of Pattern 'A' 281 and Pattern 'C' 283 of pattern library 280.

In one embodiment, applications in application library 260 may be organized in categories. For example, based on types of services provided by the applications. Categories may be provided by category library 270. In one embodiment, category library 270 may be coupled to application library 260. Category library 270 may include a number of categories such as Category 'A' 271, Category 'B' 272, Category 'C' 273, and Category 'D' 274. Examples of categories include, but are not limited to, human resources, project management, development, marketing, etc.

Meta application 220 may be created from meta application template 240, according to one embodiment. Accordingly, attributes and applications of meta application 220 may be selected from libraries such as context library 250, application library 260 and pattern library 280. Meta application 220 may be configured based on meta application template 240. Meta application 220 may be assigned Context 'A' 221, Context 'B' 222 and Pattern 'A' 223. Further, as part of a configuration process, a number of applications (e.g., application 224, application 227, application 230, application 233, and application 236) are selected and included in the meta application 220. In one embodiment, applications are represented in the meta application 220 according to Pattern 'A' 223.

Applications included in meta application 220 may have context attributes. Application contexts may be provided by context library 250, according to one embodiment. Similar to contexts of meta applications, application contexts provide information for applications such as user, project, solution, organizational unit, customer, material, etc. Application contexts may be used to filter data displayed by the application. For example, data may be filtered based on relevance to a specific user or a project.

In one embodiment, a specific instance of meta application 220 such as user specific meta application instance 210 may be created. User specific meta application instance 210 may inherit attributes and applications of meta application 220. In one embodiment, a personalization option may be available to enable selection of applications in the user specific meta application instance 210. To personalize the applications hosted by the user specific meta application instance 210, the applications may be selected from the number of applications already hosted by the meta application 220, according to one embodiment.

In one embodiment, upon selection of applications, user specific meta application instance 210 may include application 204, application 207 and application 212 that represent references to corresponding application 224, application 230 and application 233, respectively, of meta application 220.

User specific meta application instance 210 may have a number of attributes. Attributes may include at least a pattern and one or more contexts. For example, Context 'A' 201 and Context 'B' 202 may be values of the attribute context of the user specific meta application instance 210. Further, Pattern 'A' 203 may be a value of the attribute pattern of the user specific meta application instance 210. In one embodiment, attributes of the user specific meta application instance 210 may be inherited from meta application 220.

Due to inheritance, attributes of user specific meta application instance 210 and attributes of meta application 220 may point to the same objects, according to one embodiment. For example, Pattern 'A' 203 of user specific meta application instance 210 and Pattern 'A' 223 of meta application 220 may refer to Pattern 'A' 281 provided by patent library 280. Similarly, Context 'A' 201 and Context 'A' 221 may refer to Context 'A' 251 provided by context library 250, and so on.

In one embodiment, the attribute context may be inherited by user specific meta application instance 210. Values of contexts, however, may be different for the different instances of the meta application 220. Values of contexts may be manually entered or selected by user 105. Values may also be calculated automatically. For example, value of Context 'A' 201 may be automatically calculated to be "user 105" as user 105 is already authenticated by the system. Further, value of Context 'B' may be manually selected by user 105 to be "Project Y".

In one embodiment, contexts of user specific meta application instance 210 may be compared to contexts of applications. Based on comparison, application contexts are altered in a way to exclude application contexts that do not refer to the same contexts from context library 250 as contexts of user specific meta application instance 210. For example, upon comparison of Context 'A' 201 and Context 'B' 202 with contexts of application 204, application 207 and application 212, the contexts of application 204, application 207 and application 212, respectively, are filtered. In response, application 204 has a single Application Context 'A' 205, application 207 retains Application Context 'A' 208 and Application Context 'B' 209 and application 212 now has a single Application Context 'B' 213, according to one embodiment. Comparison of contexts is performed to ensure that information presented inside applications is filtered based on contexts of user specific meta application instance and not based on contexts of applications. That is, the contexts associated with the user specific meta application instance have higher priority than the contexts associated with the corresponding hosted applications.

Attribute pattern of meta application 220 is inherited by the user specific meta application instance 210 with both attribute and attribute value. For example, in case Pattern 'A' 223 has value "details", Pattern 'A' 203 may not only be inherited as an attribute, but value "details" may be inherited as well. In one embodiment, a specific pattern from pattern library 280 may provide more personalization options to users in addition to determining behavior of applications. For example, Pattern 'A' 203 with value "mixture" that is applied to user specific meta application instance 210 may provide an individual pattern selection option for each application included in the user specific meta application instance 210. The individual pattern selection option may enable assignment of patterns on the level of individual applications and on the level of their user specific meta application instance 210.

Configuration of user specific meta application instance 210 may be stored as a unique personalization file in database 115, according to one embodiment. For example, an XML file may be created in database 115 to store configuration of user specific meta application instance 210. Database 115 may be any kind of database that includes a collection of data organized in such a way that contents can be accessed, managed and updated. For example, database 115 may be hierarchical, relational, object oriented, or associative.

Figure 3:
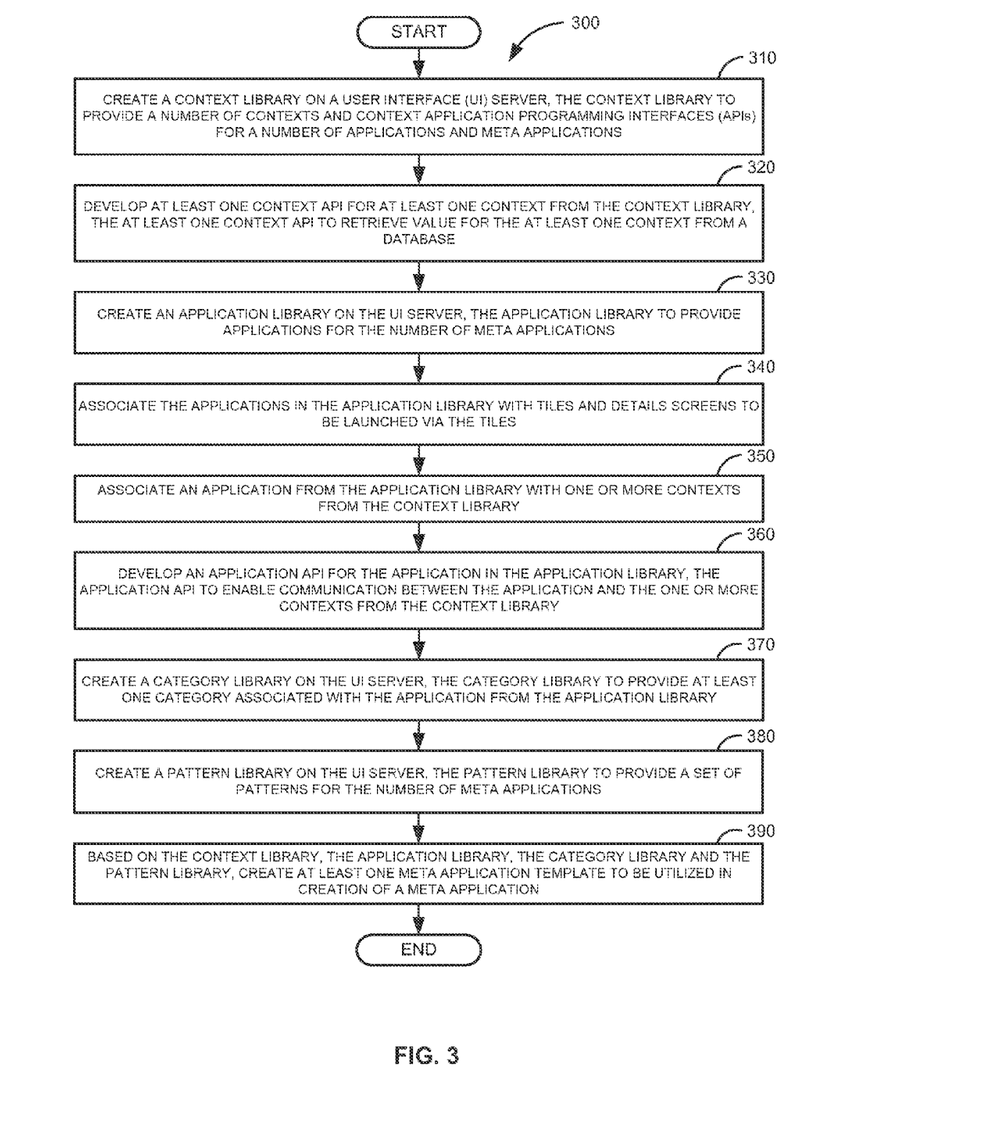
FIG. 3 is a flow diagram illustrating a process to create a meta application template based on a context library, application library, category library, and pattern library, according to one embodiment.

FIG. 3 illustrates process 300 to create a meta application template based on a context library, an application library, a category library, and a pattern library, according to one embodiment. At 310, a context library is created on a user interface (UI) server. Context library may provide contexts for a number of applications and meta applications. At 320, a context Application Programming Interface (API) is created for each context in the context library. The context API may retrieve value for the context from a database. At 330, an application library is created on the UI server. The application library may provide applications to be included in meta applications based on user selection. At 340, applications in the application library may be associated with corresponding patterns of type, for example, tiles and details screens. An application hosted by the meta application may be displayed in accordance with the pattern assigned to the meta application.

At 350, an application from the application library is associated with one or more contexts from the context library, according to one embodiment. A context may be associated with more than one application from the application library. An association is created to define contexts from the context library that correspond to applications from the application library. At 360, an application API is created. Application API may enable communication between an application from the application library and corresponding contexts from the context library. At 370, a category library is created on the UI server. The category library provides categories to classify applications, according to one embodiment. Each application from the application library is associated with a category from the category library.

At 380, a pattern library is created on the UI server. The pattern library may provide patterns for meta applications and applications hosted by the meta applications, respectively. For each pattern available in the pattern library, there is an implementation of the pattern applicable to a corresponding application from the application library. At 390, a meta application template is created. The meta application template may provide access to contexts, applications and patterns based on the context library, the application library and the pattern library, according to one embodiment. In one embodiment, the meta application template may be utilized in creation of meta applications. A number of meta application templates may be created, each meta application template providing one or more contexts, one or more applications and one or more patterns from the respective libraries.

Figure 4:
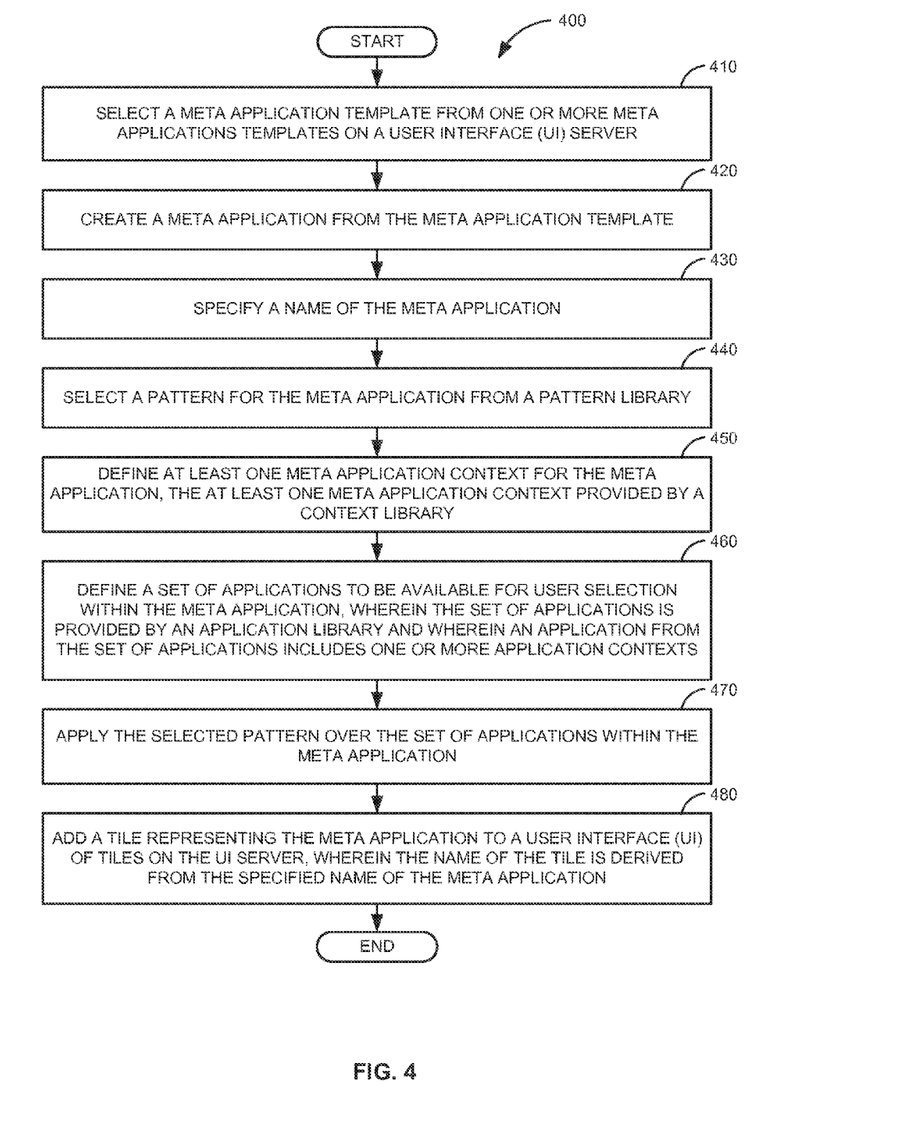
FIG. 4 is a flow diagram illustrating a process to create a meta application based on a meta application template, according to one embodiment.

FIG. 4 illustrates process 400 to create a meta application based on a meta application template, according to one embodiment. At 410, a meta application template is selected. The meta application template may be selected from a number of meta application templates stored on a UI server. At 420, a meta application is created from the selected meta application template. The meta application template may provide access to a number of contexts, a number of applications and a number of patterns. In one embodiment, the meta application template may provide access to a set of contexts from the number of contexts, a set of applications from the number of applications and a set of patterns from the number of patterns. At 430, a name for the meta application is specified. At 440, a pattern is selected for the meta application instance. The pattern may be selected from patterns relevant to the meta application template. The meta application template is designed to restrict the number of patterns that can be assigned to a meta application instance based on the template.

At 450, one or more meta application contexts are defined for the meta application. Contexts are defined to determine various aspects of the meta application. A context may provide configuration information to a meta application. A context may include conditions or circumstances that affect the meta application and the applications hosted by the meta application, respectively. The one or more meta application contexts may be selected from contexts relevant to the meta application template. At 460, a subset of applications from the set of applications is defined. The subset of applications may include applications hosted by the meta application. A user specific meta application instance of the meta application may provide selection option for a user to select one or more applications from the subset of applications to be included in the user specific meta application instance.

At 470, the selected pattern is applied over the subset of applications. In one embodiment, the selected pattern is applied by assigning, in accordance with the selected pattern, patterns of applications from the subset of applications to the created meta application instance. At 480, a tile that represents the created meta application is added to a UI of tiles on the UI server. The UI of tiles may include tiles that represent meta application and tiles that directly represent applications, according to one embodiment. The name of the tile may be derived from the specified name of the meta application.

Figure 5A:
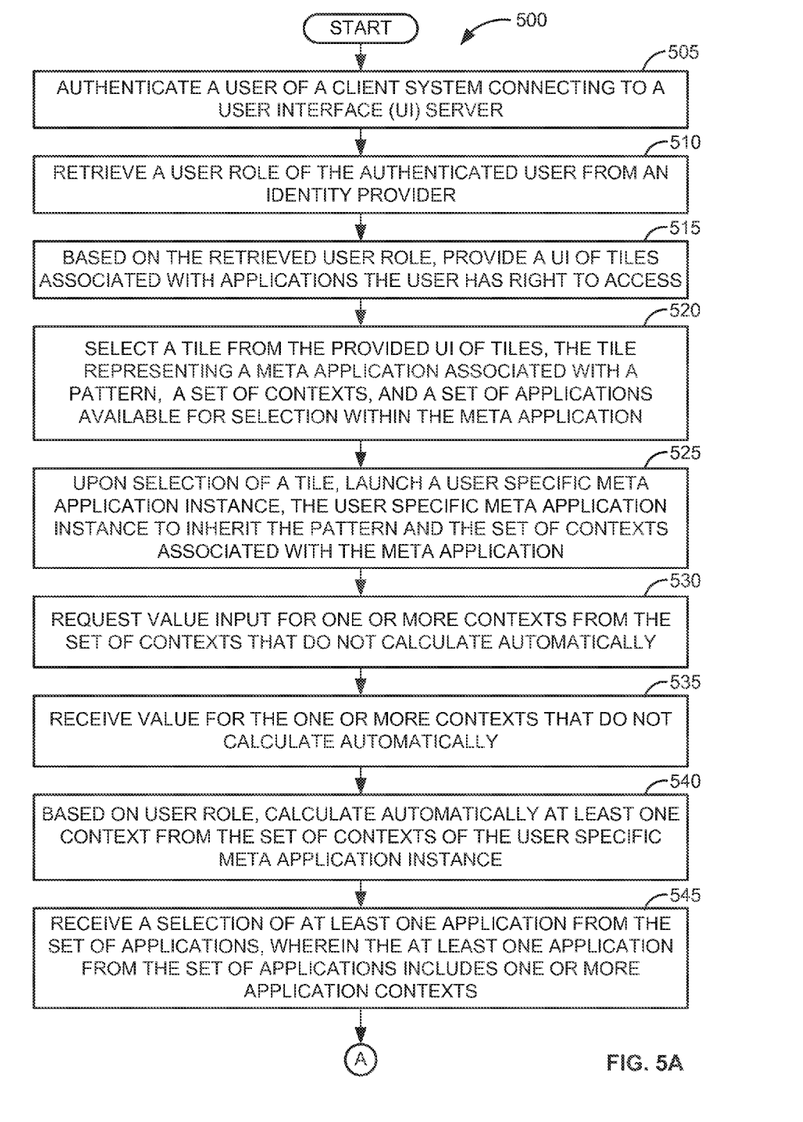
FIGS. 5A-B are flow diagrams illustrating a process to display a user specific UI, according to one embodiment.
Figure 5B:
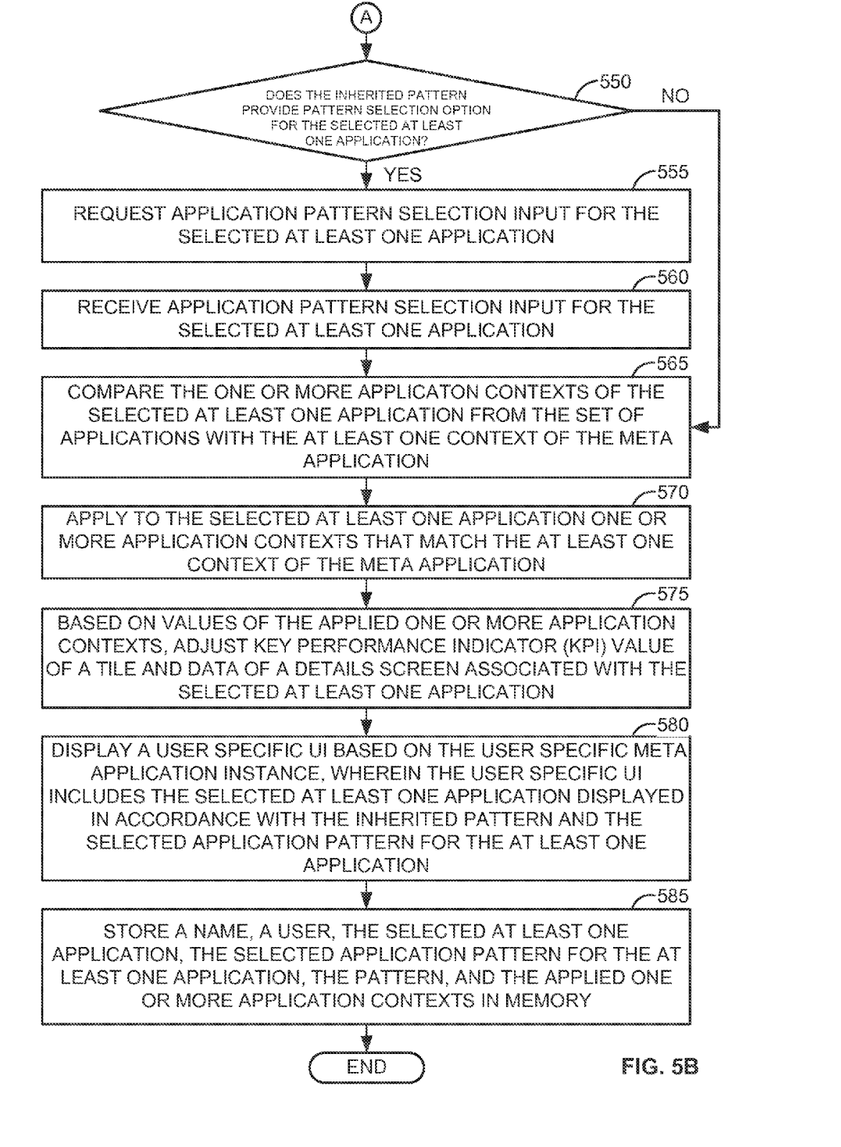

FIGS. 5A-B illustrate a process 500 to create a user specific UI, according to one embodiment. At 505 (FIG. 5A), a user of a client system that is connecting to a UI server is authenticated. At 510, a role of the user is retrieved from the identity provider based on the received user credentials. At 515, a UI of tiles may be provided to the user. Tiles included in the UI of tiles may represent applications and meta applications that the user has right to access based on the retrieved role of the user. At 520, a tile from the UI of tiles is selected. The selected tile may represent corresponding meta application. The meta application may be associated at least with a pattern, one or more contexts and one or more applications available for user selection based on the meta application instance. At 525, upon selection of a tile, a user specific meta application instance is launched. The pattern and the one or more contexts may be inherited from the meta application.

In one embodiment, values for the one or more contexts may be calculated automatically. For example, based on the authenticated user. A context from the one or more contexts may be "user". Since the user is already authenticated, the system has retrieved user information from the identity provider. Therefore, for context "user" the system does not need any user input and may calculate automatically value for context "user". Alternatively, values of the one or more contexts may be received through a user input. In one embodiment, the launched user specific meta application instance may request, at 530, value input for contexts from the one or more contexts that do not calculate automatically. At 535, upon receiving the input values for contexts that do not calculate automatically, the user specific meta application instance may calculate automatically. At 540, other contexts of the one or more contexts based on the user.

At 545, a selection of at least one application from the set of applications may be received. The at least one application is selected from the set of applications in the meta application to be included in the user specific meta application instance. The at least one application may include one or more application contexts.

At 550 (FIG. 5B), it is checked whether the inherited pattern provides pattern selection option for applications from the selection of at least one application. In one embodiment, the inherited pattern may not provide selection option and therefore the process to create a user specific UI may continue at 565 by comparing the one or more application contexts with the one or more contexts of the meta application. When the inherited pattern provides a pattern selection option for applications from the selection of at least one application, at 555, application pattern selection input is requested. The application pattern selection input may determine pattern individually for each application from the selection of at least one application. Upon receiving of application pattern selection input at 560, the one or more application contexts of the selected at least one application may be compared with the one or more contexts of the meta application instance at 565. Comparison of application contexts and contexts of the meta application instance may be performed to determine matching application contexts and contexts of the meta application that represent a reference to a common context from a context library, according to one embodiment.

At 570, the determined matching contexts of the meta application may be applied to the selected at least one application. At 575, a KPI value of a tile and data of a details screen associated with the at least one application are adjusted based on values of the applied one or more matching contexts. For example, the user specific meta application instance may have a context with value "User 105" and a context with value "Project Y". Accordingly, KPI values of a tile and data of details screens may be filtered in a way to display information relevant to the context with value "User 105" and the context with value "Project Y".

At 580, a user specific UI is displayed. The user specific UI may be based on the user specific meta application instance. The user specific UI may include the selection of at least one application displayed in accordance with the inherited pattern and individually determined pattern based on the application pattern selection input, according to one embodiment.

The process to create a user specific UI continues at 585 where configuration of the user specific meta application instance is stored in a database. Stored configuration may include at least the name of the user specific meta application instance, the user, the selection of at least one application, the individually determined pattern, the pattern of the user specific meta application instance, and the applied matching context.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 6:
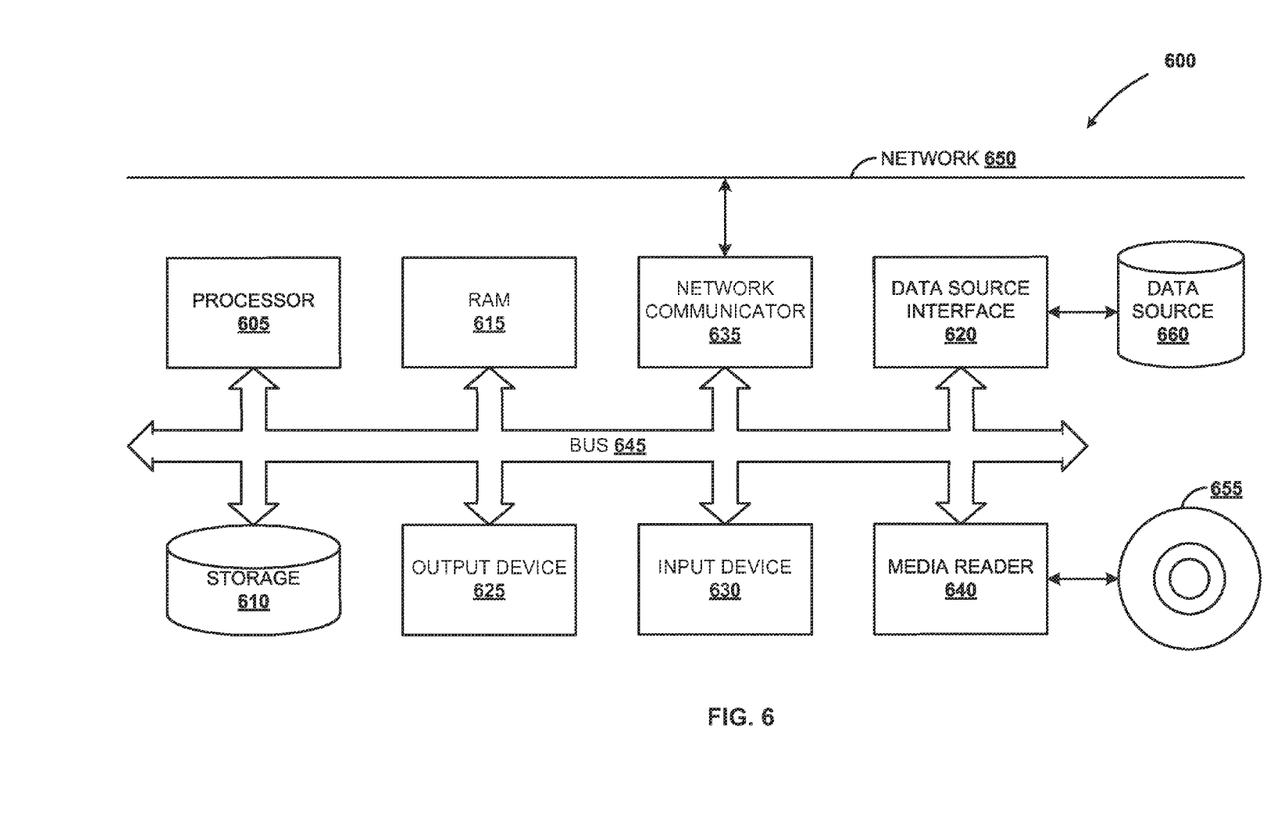
FIG. 6 is a block diagram of an exemplary computer system, according to one embodiment.

FIG. 6 is a block diagram of an exemplary computer system 600. The computer system 600 includes a processor 605 that executes software instructions or code stored on a computer readable storage medium 655 to perform the above-illustrated methods. The processor 605 can include a plurality of cores. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. According to some embodiments, such as some in-memory computing system embodiments, the RAM 615 can have sufficient storage capacity to store much of the data required for processing in the RAM 615 instead of in the storage 610. In some embodiments, all of the data required for processing may be stored in the RAM 615. The stored instructions may be further compiled to generate other representations of the instructions and dynamically stored in the RAM 615. The processor 605 reads instructions from the RAM 615 and performs actions as instructed. According to one embodiment, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to build personalized User Interface (UI) instances, the method comprising:
    launching a user specific meta application instance to inherit a pattern of display and at least one context from a meta application instance, wherein the pattern of display is selected from a plurality of patterns of display;
    receiving a context value for the at least one context of the user specific meta application instance;
    receiving a selection of one or more applications from a plurality of applications hosted by the user specific meta application instance, wherein an application from the selected one or more applications is associated with a corresponding pattern of display from the plurality of patterns of display;
    for the application from the selected one or more applications, determining, by a processor of the computer, one or more application contexts that match the at least one context of the user specific meta application instance;
    applying to the application from the selected one or more applications the matching one or more application contexts of the user specific meta application instance; and
    displaying a user specific UI based on the user specific meta application instance, wherein the user specific UI comprises the selected one or more applications displayed in accordance with the inherited pattern of display and the matching one or more application contexts.

2. The computer implemented method of claim 1 further comprising:
    providing a plurality of tiles displayed on a UI accessible to a user based on a role of the user, wherein the plurality of tiles comprises a tile representing the meta application instance; and
    selecting the tile representing the meta application instance, wherein the meta application instance is associated with the pattern of display and the at least one context.

3. The computer implemented method of claim 1 further comprising:
    creating the meta application instance from a meta application instance template associated with the plurality of patterns of display and a plurality of applications.

4. The computer implemented method of claim 1, wherein receiving the value of the at least one context of the user specific meta application instance further comprises:
    determining automatically the value of the at least one context based on a role of the user.

5. The computer implemented method of claim 1, wherein receiving the value of the at least one context of the user specific meta application instance further comprises:
    receiving the value of the at least one context in response to a user input.

6. The computer implemented method of claim 1, wherein displaying the user specific UI based on the user specific meta application instance further comprises:
    displaying an application tile that represents the application from the selected one or more applications on the user specific UI; and
    adjusting a value of a Key Performance Indicator (KPI) associated with the displayed application tile based on values of the matching one or more application contexts.

7. The computer implemented method of claim 1, wherein displaying the user specific UI based on the user specific meta application instance further comprises:
    displaying an application details screen that represents the application from the selected one or more applications on the user specific UI; and
    adjusting data of the displayed application details screen based on values of the matching one or more application contexts.

8. A computer system to integrate applications with different patterns, the computer system comprising:
    at least one processor and memory for executing program code, the program code comprising:
        a plurality of applications having different original patterns of display, wherein an application from the plurality of applications is stored in an application library;
        a plurality of patterns of display stored in a pattern library, wherein the plurality of patterns of display comprises the original patterns of display;
        a meta application instance having a meta application pattern of display selected from the plurality of patterns of display, wherein the meta application instance comprises a set of applications; and
        a user specific meta application instance to integrate one or more applications from the set of applications under the meta application pattern of display, wherein the user specific meta application instance is created by inheriting the meta application pattern of display from the meta application instance.

9. The computer system of claim 8, wherein the meta application instance is created from a meta application instance template.

10. The computer system of claim 9, wherein:
    the meta application instance template is coupled to the application library to provide the plurality of applications; and
    the meta application instance template is coupled to the pattern library to provide the plurality of patterns of display.

11. The computer system of claim 8 further comprising:
    a pattern of display implementation associated with the application from the plurality of applications in the application library, wherein the pattern of display implementation corresponds to the meta application pattern of display.

12. The computer system of claim 8, wherein the plurality of patterns of display comprises:
    a mixture pattern of display to enable the one or more applications integrated under the meta application pattern of display to provide an individual pattern of display selection option.

13. The computer system of claim 8 further comprising:
a category library coupled to the application library, wherein the category library provides a category from a plurality of categories for the application from the plurality of applications; and
a context library coupled to the application library, wherein the context library provides at least one context from a plurality of contexts for the application from the plurality of applications.

14. The computer system of claim 13 further comprising:
at least one context Application Programming Interface (API) in the context library to retrieve value for the at least one context from a database.

15. The computer system of claim 13 further comprising:
at least one application API in the application library to enable communication between the application and the at least one context.

16. A non-transitory computer readable medium storing instructions, which when executed by at least one processor cause a computer to perform operations comprising:
launching a user specific meta application instance to inherit a pattern of display and at least one context from a meta application instance, wherein the pattern of display is selected from a plurality of patterns of display;
receiving a value for the at least one context of the user specific meta application instance;
receiving a selection of one or more applications from a plurality of applications provided by the user specific meta application instance, wherein an application from the one or more applications is associated with a corresponding pattern of display from the plurality of patterns of display;
for the application from the selected one or more applications, determining, by the processor of the computer, one or more application contexts that match the at least one context of the user specific meta application instance;
applying to the application from the selected one or more applications the matching one or more application contexts of the user specific meta application instance; and
displaying a user specific UI based on the user specific meta application instance, wherein the user specific UI comprises the selected one or more applications displayed in accordance with the inherited pattern of display and the matching one or more application contexts.

17. The computer readable medium of claim 16 further comprising:
providing a UI of tiles accessible to a user based on a role of the user, wherein the UI of tiles comprises a tile representing the meta application instance; and
selecting the tile representing the meta application instance, wherein the meta application instance is associated with the pattern of display and the at least one context.

18. The computer readable medium of claim 16, wherein receiving the value of the at least one context of the user specific meta application instance further comprises:
determining automatically the value of the at least one context based on a role of the user; and
receiving the value of the at least one context in response to a user input.

19. The computer readable medium of claim 16, wherein displaying the user specific UI based on the user specific meta application instance further comprises:
displaying an application tile that represents the application from the selected one or more applications on the user specific UI; and
adjusting a value of a Key Performance Indicator (KPI) associated with the displayed application tile based on values of the matching one or more application contexts.

20. The computer readable medium of claim 16, wherein displaying the user specific UI based on the user specific meta application instance further comprises:
displaying an application details screen that represents the application from the selected one or more applications on the user specific UI; and
adjusting data of the displayed application details screen based on values of the matching one or more application contexts.

* * * * *